United States Patent
Luong et al.

(10) Patent No.: US 8,441,669 B2
(45) Date of Patent: May 14, 2013

(54) SG3-TO-G3 FAX SPOOF

(75) Inventors: Hanh Huu Luong, Santa Barbara, CA (US); Brooks Stevens Read, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 594 days.

(21) Appl. No.: 12/715,953

(22) Filed: Mar. 2, 2010

(65) Prior Publication Data

US 2011/0216892 A1 Sep. 8, 2011

(51) Int. Cl.
- *G06F 3/12* (2006.01)
- *H04N 1/32* (2006.01)
- *H04M 11/00* (2006.01)

(52) U.S. Cl.
USPC ..... 358/1.15; 358/1.13; 358/442; 379/100.01

(58) Field of Classification Search ............... 358/1.15, 358/1.13, 442, 444, 468, 434, 407, 425; 379/100.01, 379/100.171, 100.17, 90.1
See application file for complete search history.

(56) References Cited

U.S. PATENT DOCUMENTS

| | | | |
|---|---|---|---|
| 6,437,870 B1* | 8/2002 | Yoshida et al. | 358/1.15 |
| 6,577,715 B1* | 6/2003 | Atsuta | 379/100.17 |
| 6,757,367 B1* | 6/2004 | Nicol | 379/90.01 |
| 6,819,750 B1* | 11/2004 | Mehta et al. | 379/100.17 |
| 6,961,137 B1* | 11/2005 | Tamura | 358/1.15 |
| 7,046,382 B1* | 5/2006 | Chu | 358/1.15 |
| 7,359,370 B1* | 4/2008 | Renkel et al. | 370/352 |
| 7,623,273 B1* | 11/2009 | Garakani et al. | 358/407 |
| 7,907,708 B2* | 3/2011 | Walker et al. | 379/93.09 |
| 2001/0033642 A1* | 10/2001 | Abrishami et al. | 379/100.01 |
| 2002/0114017 A1* | 8/2002 | Ono et al. | 358/426.04 |
| 2003/0123466 A1* | 7/2003 | Somekh et al. | 370/401 |
| 2004/0059823 A1* | 3/2004 | Garakani et al. | 709/230 |
| 2005/0168785 A1* | 8/2005 | Garakani et al. | 358/434 |
| 2006/0067301 A1* | 3/2006 | Fruth et al. | 370/352 |
| 2007/0165269 A1* | 7/2007 | Kimoto | 358/1.15 |
| 2007/0223053 A1* | 9/2007 | Jin | 358/439 |
| 2009/0028168 A1* | 1/2009 | Somekh et al. | 370/401 |
| 2009/0051965 A1* | 2/2009 | Inoishi | 358/1.15 |
| 2010/0080219 A1* | 4/2010 | Watanabe | 370/389 |

OTHER PUBLICATIONS

ITU-T Recommendation T.30, *Procedures for document facsimile transmission in the general switched telephone network*, International Telecommunication Union, Sep. 2005.

ITU-T Recommendation T.38, *Procedures for real-time Group 3 facsimile communication over IP networks*, International Telecommunication Union, Apr. 2007.

* cited by examiner

*Primary Examiner* — Madelein A Nguyen
(74) *Attorney, Agent, or Firm* — Brinks Hofer Gilson & Lione

(57) ABSTRACT

In one embodiment, an originating gateway receives a call menu (CM) signal from an originating fax machine. The CM signal may have been generated in response to an ANSam signal from a terminating fax machine. The originating gateway suppresses the CM signal after a preamble of the CM signal and generates a modified JM signal in response to receiving the CM signal. The modified JM signal indicates that V.34 half-duplex modulation is not an option. The originating gateway transmits the modified JM signal to the originating fax machine, which allows the transmission to continue across an unenhanced T.38 fax relay.

20 Claims, 5 Drawing Sheets

SG3-TO-G3 FAX SPOOF

FIELD

The present embodiments relate generally to fax machines.

BACKGROUND

Fax machines may be interconnected using conventional analog telephone circuits operating end-to-end using G.711 signal encoding, which is also referred to as pulse code modulation. Fax messages may also be transmitted over packet networks using the T.38 protocol, which is also referred to as "fax relay". When fax machines are interconnected via a packet network, G.711 encoding may be used during the setup of the connection.

Subsequently, when the actual fax transmission begins, the network connection may switch to fax relay operation. A newer version of the T.38 fax relay specification, hereinafter "enhanced T.38", includes support for Super Group 3 ("SG3") fax procedures. An older version of the T.38 fax relay specification, hereinafter "unenhanced T.38", supports Group 3 ("G3") fax procedures and does not support SG3 fax procedures. When SG3 fax machines attempt to communicate through an unenhanced T.38 fax relay link, the fax transmission will fail.

DESCRIPTION

Overview

Figure 1:
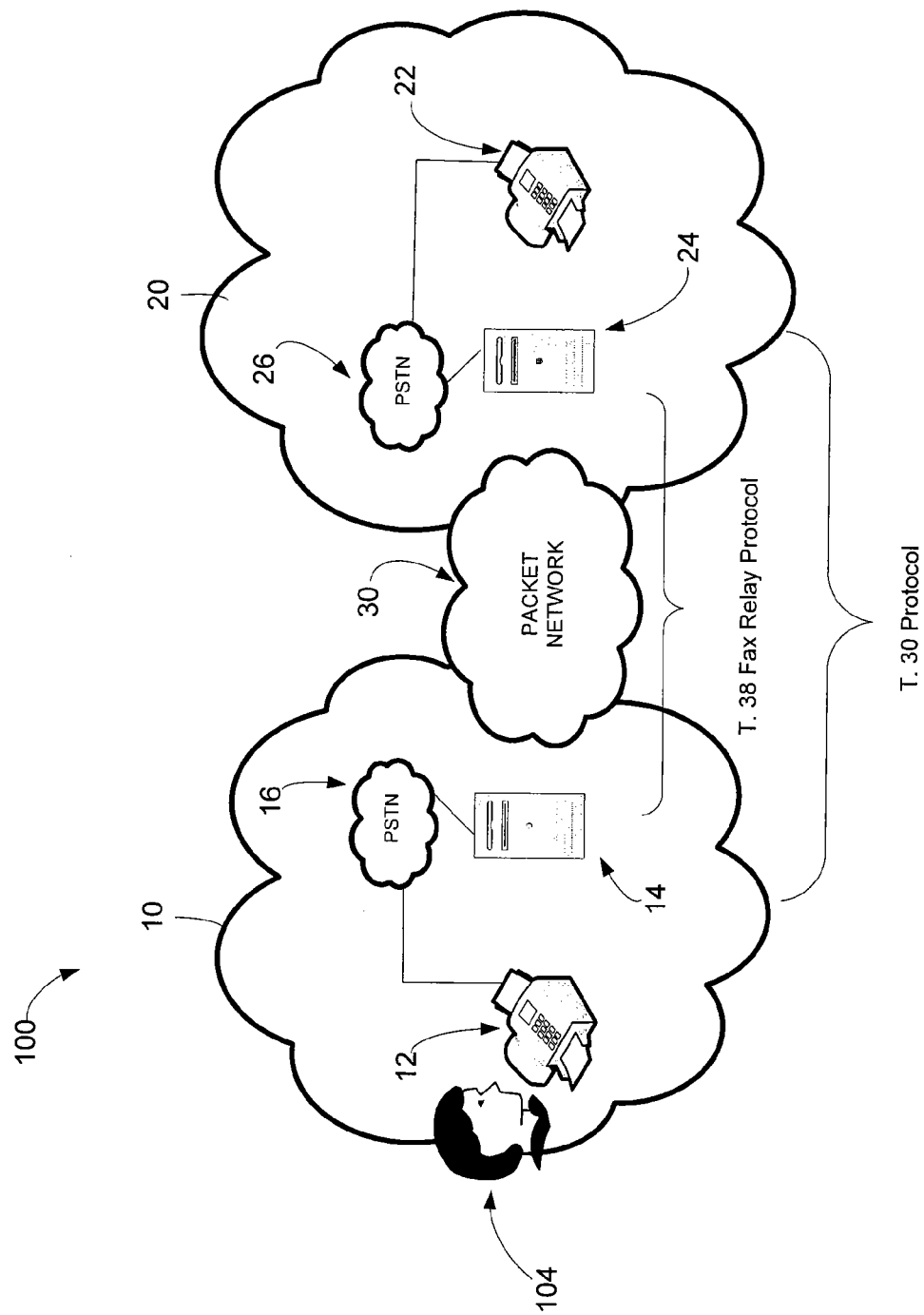
FIG. 1 illustrates one embodiment of a fax system.

The present embodiments relate generally to interconnecting fax machines. In particular, the present embodiments may relate to transmitting a modified Joint Menu (JM) signal to an originating fax machine for the purpose of inducing the originating fax machine to fall back from SG3 procedures to G3 procedures in order to permit operation across unenhanced T.38 fax relay. For example, once an SG3 originating fax machine has detected an ANSam message the SG3 originating fax machine may ignore subsequent T.30 V.21 preamble messages and continue to return Call Menu (CM) messages. If this occurs, the fax transmission cannot proceed across an unenhanced T.38 implementation. The gateway may transmit the modified JM signal in order to force G3 operation in the originating fax machine. In other words, the modified JM signal may be used to spoof the originating fax machine into communicating using G3 speeds or protocols. Accordingly, the fax session may continue at G3 speeds, and therefore successfully transmit across an unenhanced T.38 fax relay link.

In a first aspect, a method includes receiving a CM signal from an originating fax machine, suppressing the CM signal after a preamble of the CM signal, generating a modified JM signal in response to receiving the CM signal, wherein the modified JM signal indicates that V.34 half-duplex modulation is not an option, and transmitting the modified JM signal to the originating fax machine.

In a second aspect, a device includes a time division multiplexing (TDM) interface, and a detector in a packet-based channel at the TDM interface, wherein the detector monitors for V.8 CM sequences that indicate fax operation is requested and monitors for a V.21 flags detected peer-to-peer message from the remote gateway. The detector, in response to detecting a V.8 CM sequence, transmits a V.8 JM signal to an originating fax machine via the TDM interface. The V.8 JM signal excludes an indication of SG3 fax modulation capabilities.

DETAILED DESCRIPTION

The present embodiments relate generally to fax machines, such as G3 fax machines and SG3 fax machines. G3 fax machines are capable of operating at top speed of 14,400 bits per second ("bps") using, for example, V.21, V.27ter, V.29, and V.17 modulation. SG3 fax machines are capable of operating at speeds of up to 33,600 bps using the V.8 protocol and V.34 modulation. The V-Series protocols are modem protocols that have been documented and published by International Telecommunication Union (ITU) standard committees.

When a SG3 fax machine initially contacts another SG3 fax machine, the V.8 protocol is used to establish the modulation modes in common between the two fax machines. The answering SG3 fax machine may be referred to as the terminating fax machine or as the second fax machine. According to the V.8 protocol, the answering SG3 fax machine generates an ANSam tone after answering the incoming call. The ANSam tone is a 2100 Hz tone with 15 Hz amplitude modulation. The ANSam tone is used to communicate to the originating SG3 fax machine that the terminating SG3 fax machine is V.8 capable. In response to the ANSam tone, the originating SG3 fax machine may generate a CM signal. The CM signal includes a set of all the fax modulations supported by the originating SG3 fax machine. When the terminating SG3 fax machine receives the CM signal, the terminating SG3 fax machine replies with a JM signal that indicates the particular modulation selected for that particular call, which is typically the modulation with the highest speed capability at which both machines can operate.

Fax machines connected over packet networks may be generally connected using gateways that support a protocol known as the fax relay protocol as described in ITU-T Rec. T.38, The original version of T.38 fax relay protocol only included support for G3 fax procedures. The T.38 fax relay protocol was later extended to include support for SG3 fax procedures, which can use V.34 half-duplex modulation for image data transfer at up to 33,600 bps. However, some of the T.38 gateways have not been upgraded to handle SG3 procedures. A gateway operating according to the enhanced T.38 protocol may be an enhanced T.38 gateway. A gateway operating according to the unenhanced T.38 protocol may be an unenhanced T.38 gateway.

The present embodiments relate to connecting SG3 fax machines over a network at least some part of which operates using the unenhanced T.38 protocol. In particular, present embodiments relate to SG3 fax machines that communicate over a network, for example, including one or more gateways that have not been upgraded to handle SG3 fax relay procedures. In one embodiment, a CM signal provided by an originating SG3 fax machine is suppressed during the communication between the originating SG3 fax machine and the terminating SG3 fax machine. As used herein, suppression may include detecting and not forwarding to a terminating gateway coupled with a terminating SG3 fax machine. For example, when a CM message in the CM signal is suppressed, the terminating gateway that transmitted the ANSam tone to the originating gateway, will not receive a complete response.

In one embodiment, in response to detecting a CM signal from the originating SG3 fax machine, an originating gateway may transmit a modified JM signal to an originating fax machine. For example, the modified JM signal may be transmitted to the originating SG3 fax in response to confirmation that the originating fax machine is unable or not configured to communicate as SG3 speeds. Confirmation may be determined by monitoring one or more responses from the originating fax machine. For example, the originating fax machine may continue to return Call Menu (CM) messages even after the originating fax machine has begun to receive G3 fax messages from the answering fax. Based on these responses, it may be confirmed that the originating fax machine strictly implements V.8 procedures, which only provide for a JM signal response to a transmitted CM signal (or else timeout and call failure). A fax machine "strictly implements" V.8 procedures when the fax machine requires completion of V.8 negotiations once the fax machine has begun sending CM sequences.

FIG. 1 illustrates a fax network 100. The fax network 100 may include one, two, three, or more fax networks. The fax network 100 may be used to transmit one or more fax messages. A fax message includes the communication in both directions between an originating fax machine and a terminating fax machine. The fax message includes the image portion (i.e., the image being faxed), which is transmitted from the originating fax machine to the terminating fax machine. The fax message also includes one or more control messages in both directions between the originating fax machine and the terminating fax machine. The control messages includes, but is not limited to, a modem handshake, as discussed below. As used herein, originating relates to origination, sending, beginning, and/or initiating. Terminating relates to termination, reception, ending, and/or responding.

In one example, the terminating fax machine may transmit a fax message with an image portion to the originating fax machine. This technique may be used to provide a receipt to the originating fax machine or to permit the terminating fax machine to avoid toll charges from a long distance provider.

As shown in FIG. 1, the fax network 100 may include an originating fax network 10 and a terminating fax network 20. Additional, different, or fewer components may be provided in the fax network 100. A fax message may be transmitted from the originating fax network 10 to the terminating fax network 20. The originating fax network 10 may include an originating fax machine 12 and an originating gateway 14 coupled with the originating fax machine 12 via network 16. The terminating fax network 20 may include a terminating fax machine 22 and a terminating gateway 24 coupled with the terminating fax machine 22 via network 26. The originating gateway 14 may be coupled with the terminating gateway 24 via a packet network 30, such as an Internet Protocol (IP) network. As used herein, the term "coupled with" may include directly connected to or indirectly connected through one or more intermediary components, such as hardware, software, networks, or a combination thereof. The originating fax network 10 and/or the terminating fax network 20 may include additional, different, or fewer components.

The networks 16, 26 may be analog networks, digital networks, PSTN networks, PCM networks, packet based networks, Internet Protocol (IP)/Transmission Control Protocol (TCP) networks, internal networks, a combination thereof, or other types of networks. The packet network 30 may be a packet based network, such as the Internet, an IP/TCP network, or other type of network. The packet network 30 may transmit packets back and forth between the originating gateway 14 and terminating gateway 24.

The fax machines 12, 22 may be analog fax machines, digital fax machines, T.30 fax machines, G3 fax machines, SG3 machines, printers, personal computers, personal digital assistants, image scanners, modems, or other data communications equipment (DCE) configured or programmed to transmit and receive a fax message. The fax machines 12, 22 may be owned, operated, controlled, managed, or otherwise used by a user 104. The user 104 may be a human or electronic computing device (e.g., including a processor and/or memory) configured to control the fax machines 12, 22. In one embodiment, a first user may operate the fax machine 12 and a second user may operate the fax machine 22. The first user may be the same or different than the second user. The first user may transmit a fax message to the second user via the fax machines 12, 22.

The gateways 14, 24 may be Internet-aware fax devices, T.38 enabled end points, servers, routers, switches, or other a network nodes equipped for interfacing with another network that uses different protocols. For example, a T.30 fax machine may send a fax message over the PSTN to a T.38 Fax gateway which converts or encapsulates the T.30 protocol into a T.38 data stream. The fax message is sent either to a T.38 enabled end point, such as a fax machine or fax server or another T.38 gateway that converts the fax message back to PSTN pulse code modulation or analog signal and terminates the fax on a T.30 fax machine. In one embodiment, the gateways 14, 24 are gateways sold by Cisco Systems, Inc. under the family designation AS53xx, 26xx, 28xx, 37xx, 38xx, etc.

The T.38 recommendation defines the use of both transmission control protocol (TCP) and the user datagram protocol (UDP) to transport T.38 packets. Implementations tend to use the user datagram protocol (UDP), due to TCP's requirement for acknowledgement packets and resulting retransmission during packet loss, which introduces delays. When using UDP, T.38 copes with packet loss by using redundant data packets. T.38 is not a call setup protocol, thus the T.38 devices need to use standard call setup protocols to negotiate the T.38 call, for example, H.323, session initiation protocol (SIP), and/or media gateway control protocol (MGCP).

The gateways 14, 24 may be originating gateways or terminating gateways. In one embodiment, the gateway 14 may be an originating gateway and may be operable to initiate a fax setup and relay communications (including fax messages) to and from originating fax machine 12. Likewise, gateway 24 may be a terminating gateway and may be operable to relay communications (including fax messages) to and from terminating fax machine 22.

Figure 2:
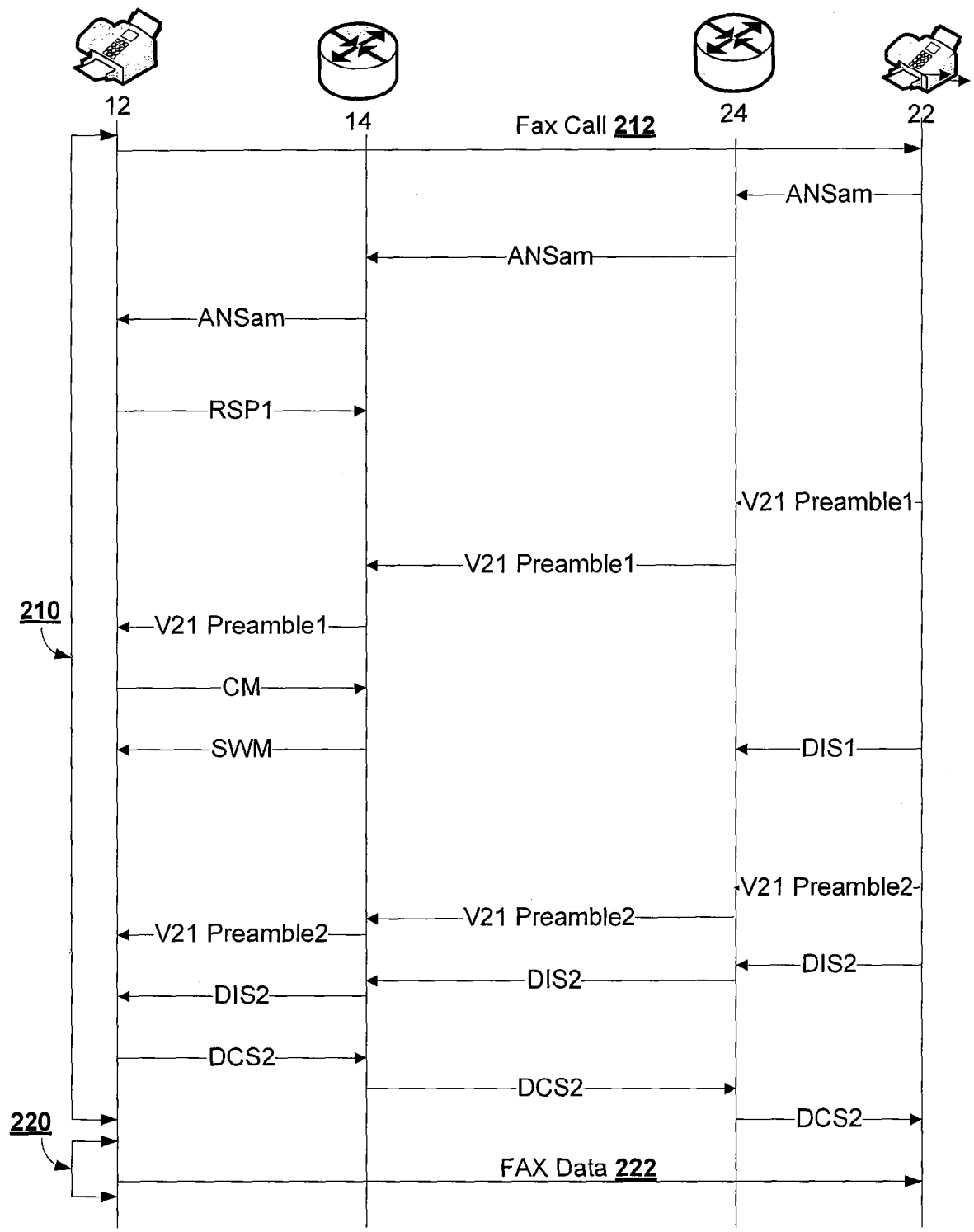
FIG. 2 illustrates one embodiment of communication between an originating fax machine and a terminating fax machine.

FIG. 2 illustrates one embodiment of a fax communication session between the originating fax machine 12 and the terminating fax machine 22 via the originating gateway 14, terminating gateway 24, and packet network 30. The communication session may be used to transmit a fax message from the originating fax machine 12 to the terminating fax machine 22. The communication session may include a fax transmission setup session 210 and a fax transmission session 220. The setup session 210 may include a handshake between the originating fax machine 12 and the terminating fax machine 22, for example, in order to establish modulation mode, transmission speed, and transmission protocol. The fax session 220 may include the transmission of the image portion of the fax message as well. The transmission may be performed, for example, by the originating fax machine 12 and the terminating fax machine 22, according to the established transmission speed, transmission protocol, and transmission data.

The originating fax machine 12 may receive an image portion of a fax message. The fax message may be, for example, scanned into the originating fax machine 12, received from memory, copied, requested or received using a network interface connected to a network, or otherwise selected. The image portion of the fax message may be one or more pages of fax data to be sent to the terminating fax machine 22. For example, in one embodiment, the user 104 may scan a fax message into the originating fax machine 12 using a fax machine having a scanner or copier system.

The originating fax machine 12 may initiate communication with the terminating fax machine 22. Initiating communication may occur before, during, or after the originating fax machine 12 receives the fax message. Initiating communication may include placing a fax call 212 to the terminating fax machine 22 over a network, such as a public switched telephone network or a plain old telephone system (POTS) telephone line using a voice connection. The originating fax machine 12 may call the terminating fax machine 22 using a standard telephone calling procedure.

The terminating fax machine 22 may answer the fax call 212 and issue or transmit a first answer message ANSam to the originating fax machine 12. The terminating fax machine 22 may be a SG3 fax machine that is configured to communicate at SG3 speeds and use the ANSam signal to attempt to initiate V.8 procedures, which are used to negotiate the modulation mode to be used for subsequent fax message transport. The negotiations may result in the selection of V.34 half-duplex data modulation mode.

If the originating fax machine 12 is V.8 capable, it responds to the ANSam with a first response message RSP1. The first response message RSP1 may be a Call Menu (CM) signal. A CM signal may indicate modulation modes available to the originating fax machine 12. The CM signal may include a repetitive sequence of bits at 300 bit/s, modulating V.21, the low-band channel defined in ITU-T V.21.

The originating gateway 14 may detect the first response message RSP1 (CM signal), and suppress the first response message RSP1. Detecting the first response message RSP1 may include detecting a series of bits or otherwise detecting a response message from the originating fax machine 12.

For example, in one embodiment, the originating gateway 14 detects a series of bits. The CM signal includes a sequence that starts with 10 ONEs (1s) followed by 10 synchronization bits. The CM signal may also include one or more octets indicating available modulation modes. The originating gateway 14 may be configured to recognize, identify, or detect the CM signal sequence. Specifically, the originating gateway 14 may read the "Call Function Octet" information field, which indicates a fax call.

In response to detecting a CM signal, the originating gateway 14 may suppress the CM signal. Suppression may include blocking, eliminating, not forwarding, or otherwise not continuing the communication session continuously until the V.21 low channel signal (CM signal) is no longer present. Suppressing the CM signal causes the originating fax machine 12 to be spoofed into switching to G3 operation, as opposed to detecting the CM signal and proceeding with SG3 operation. The originating gateway 14 may continuously monitor received signals in order to detect the first response message RSP1.

The terminating fax machine 22 may expect to receive a first response message RSP1 (e.g., since it issued an ANSam tone). The terminating fax machine 22 may wait for a certain period of time, for example, three (3) seconds. Once the wait period is finished, the terminating fax machine 22 may switch to V.21 modulation and issue a G3 (T.30) control message, such as DIS. The terminating gateway 24 may recognize the flag character preamble sequence V21P of the message. In response to recognizing the preamble V21P, the terminating gateway 24 may switch to fax relay mode. The V.21 Flag is transmitted over the packet network 30 to the originating gateway 14. The originating gateway 14 may also switch to fax relay mode. The V21 preamble V21P is transmitted to the originating fax machine 12.

After receiving the V21 preamble V21P, the originating fax machine 12 may continue to send the CM signal. In response to the CM signal, the originating gateway 14 transmits a switch message SWM to the originating fax machine 12. The switch message SWM may be a spoof message, synthetic message, modified message, modified Joint Menu (JM) message, or other message that initiates or forces a shift operation to the more mature G3 fax relay procedures. The CM signal is suppressed after the preamble and call function of the first CM sequence, so the terminating fax machine does not receive or detect the CM signal.

For example, in one embodiment, the switch message SWM is a JM signal derived from the CM message received by originating gateway 14 from the originating fax machine 12. A JM signal includes modulation modes available jointly in the originating fax machine 12 and terminating fax machine 22. The JM signal is a repetitive sequence of bits at 300 bit/s, modulated using V.21(H), the high-band channel defined by ITU-T V.21, The JM signal may be transmitted after a minimum of two identical CM sequences have been received. The JM signal starts with 10 ONE bits followed by 10 synchronization bits. The first information category in JM indicates the same call function as in the received CM sequence or, if the call function is not available in the terminating fax machine 22, JM may indicate a different call function. The originating gateway 14 may delete the V.34 half-duplex modulation bit of the received CM sequence in the derived switch message SWM. Accordingly, the switch message SWM may be a synthetic message, such as a modified JM signal. The modified JM signal may set the V.34 half-duplex indication bit to zero, for example, indicating V.34 half-duplex is not an option.

The switch message forces entry into G3 fax procedures, which may have several benefits. If one or both of the gateways is only capable of G3 fax relay procedures, the switch may enable successful fax relay operation. If one or both of the gateways has been provisioned for limited channel bandwidth, forcing G3 fax procedures may result in a reduced image data transfer rate, limiting the channel bandwidth requirement to more closely match the channel bandwidth provisions. When this benefit is required, the switch message might further modify available modulation modes to limit the G3 fax procedures to only use lower speed options within the available G3 modulation options.

At a certain period after transmitting the V21 preamble V21P, the terminating fax machine 22 may transmit a digital identification signal (DIS) message. The DIS signal may be a V21 high channel modulated signal, such as a 1750 Hz frequency shift-keying (FSK) signal with a high-level data link control (HDLC) frame structure, which indicates the answering fax machine's capabilities. The DIS signal may follow the V21 preamble V21P. The DIS signal is defined in ITU-T Rec. T.30 and diagramed in Table 2 of ITU-T Rec. T. 30, The DIS signal may include communication session information, such as the protocol to be used during the fax transmission, the speed of the fax transmission, fax transmission rules or requirements, information about the terminating fax machine 22, information about the terminating gateway 24, other fax transmission data, or a combination thereof.

In one implementation, the originating fax machine 12 may malfunction if the switch message SWM is received at the same time as or during the transmission of the DIS message. In order to avoid this malfunction, the originating gateway 24 may squelch the first DIS message DIS1 associated with the first V21 preamble V21P, which was not responded to by the originating fax machine 12. Squelching may include detecting and blocking or suppressing. In response to not receiving an answer to the first DIS message DIS1, the terminating fax machine 22 may transmit a second V21 preamble V212, The second V21 preamble V212 may be followed by a second DIS message DIS2, The second DIS message DIS2 may be forwarded to the originating gateway 14.

The second DIS message DIS2 may be similar to the first DIS message DIS1 and may include communication session information, such as the protocol to be used during the fax transmission, the speed of the fax transmission, fax transmission rules or requirements, information about the terminating fax machine 22, information about the terminating gateway 24, other fax transmission data, or a combination thereof. In response to receiving the second DIS message DIS2, the originating fax machine 12 may transmit a digital command signal (DCS) DCS2 to the terminating fax machine 22. The DCS2 may include communication session information, such as the protocol to be used during the fax transmission, the speed of the fax transmission, fax transmission rules or requirements, information about the originating fax machine 12, information about the originating gateway 14, other fax transmission data, or a combination thereof.

In one implementation, the portion of communication setup 210 between originating gateway 14 and the terminating gateway 24 remains in a voice mode of operation until after the V21 Preamble1 is detected at terminating gateway 24. At that point, terminating gateway 24 sends a control message to originating gateway 14 to switch to fax relay mode. At this point, originating gateway 14 and terminating gateway 24 are in fax relay mode.

After communication setup 210, the originating fax machine 12 may transmit fax data 222 to the terminating fax machine 22, for example, via the originating gateway 14, terminating gateway 24, and packet network 30. Transmitted fax data 222 may be in accordance with the communication session information negotiated during the handshake.

In one implementation, an originating gateway 14 with a detector is placed in a packet-based channel at a TDM interface which monitors for V.8 CM sequences that indicate fax operation is requested. When the detector finds such a CM sequence, the detector then monitors for a V.21 flags detected peer-to-peer message from the remote gateway (e.g., terminating gateway 24). If the V.21 flag message is received, the detector waits a nominal time interval for the CM sequences to cease due to the assumed detection of V.21 flags by the CM sender, and fallback to G3 operation. If CM continues, the originating gateway 14 synthesizes and substitutes a V.8 JM signal transmitted via the TDM path to the originating fax machine 12, which replaces any signal coming from the answering fax machine (e.g., terminating fax machine 22). In another implementation, the detector waits for a predetermined number (e.g., three) of CM repetitions before the originating gateway 14 synthesizes and substitutes a V.8 JM signal transmitted via the TDM path to the originating fax machine 12.

The synthesized JM is a valid JM response to the CM signal being received, but excludes any indications of SG3 fax modulation capabilities. This process has been shown in lab tests to cause fallback of the originating fax machine 12 to G3 procedures, when the originating fax machine strictly implements V.8 procedures.

Figure 3:
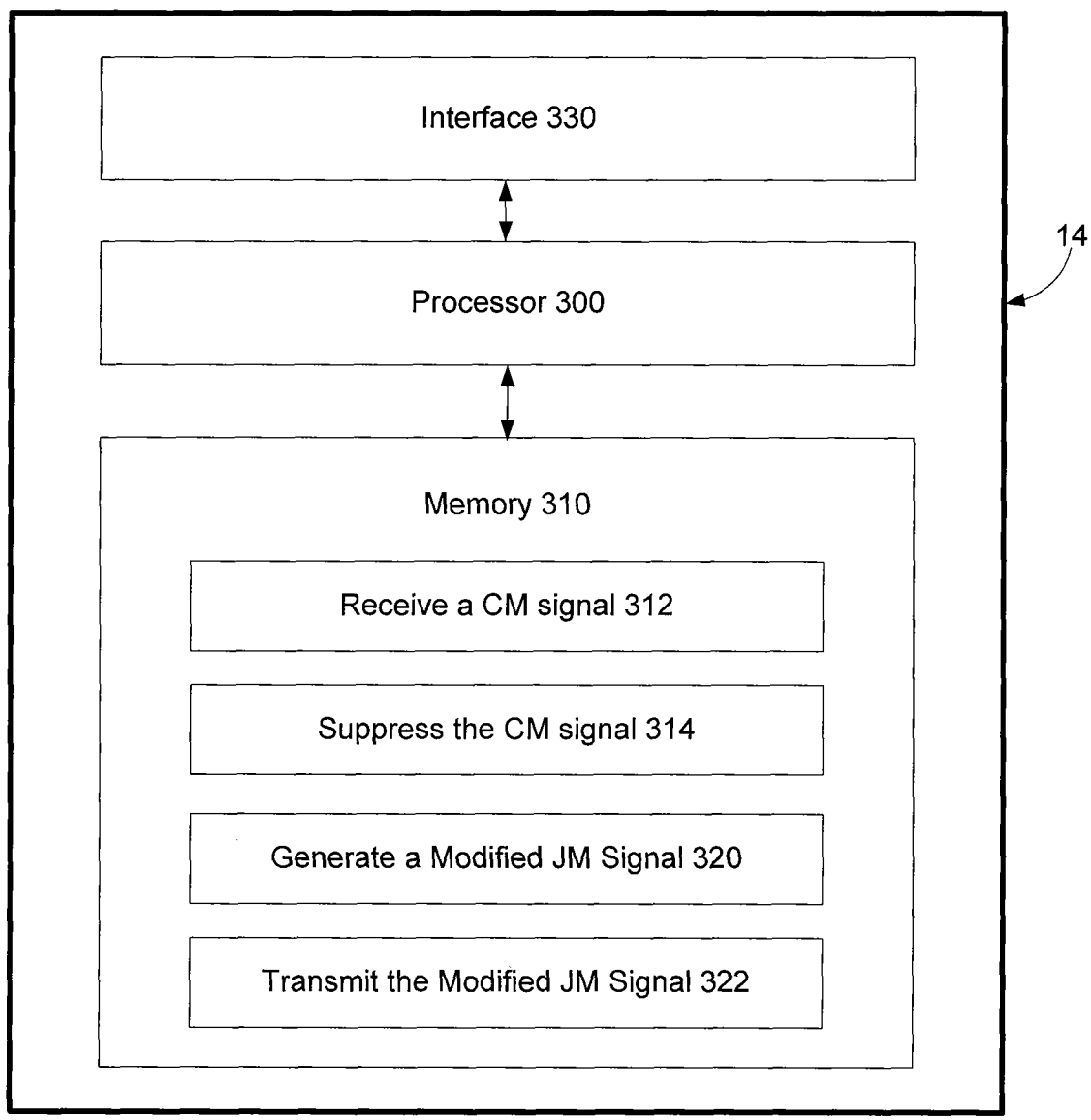
FIG. 3 illustrates one embodiment of an originating gateway.

FIG. 3 illustrates one embodiment of an originating gateway 14. The originating gateway 14 includes a processor 300, memory 310, and network interface 330. The processor 300 may be coupled with the memory 310 and network interface 330. The originating gateway 14 may include additional, different, or fewer components.

The processor 300 may be a general processor, digital signal processor, application specific integrated circuit, field programmable gate array, analog circuit, digital circuit, combinations thereof, or other now known or later developed processors. The processor 300 may be single device or a combination of devices, such as associated with a network or distributed processing. Any of various processing strategies may be used, such as multi-processing, multi-tasking, parallel processing, or the like. Processing may be local, as opposed to remote. In an alternative embodiment, processing may be performed remotely. Processing may be moved from one processor to another processor. The processor 300 may be responsive to logic encoded in tangible media. The logic may be stored as part of software, hardware, integrated circuits, firmware, micro-code or the like.

The memory 310 may be computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 310 may be a single device or combinations of devices. The memory 310 may be adjacent to, part of, programmed with, networked with and/or remote from processor 300.

The processor 300 may be operable to execute logic encoded in one or more tangible media, such as memory 310. Logic encoded in one or more tangible media for execution may be instructions that are executable by the processor and that are provided on the computer-readable storage media, memories, or a combination thereof. The processor 300 is programmed with and executes the logic. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, as shown in FIG. 3, the memory 310 may include logic that is executable to receive a Call Menu (CM) signal from an originating fax machine 312. The CM signal may be generated in response to an ANSam signal, for example. The logic 312 may be executable to detect a CM signal, for example, by monitoring one or more bit sequences. The one or more bit sequences may indicate that a CM signal was received. The memory 310 may include logic that is executable to suppress the CM signal 314. The logic 314 may be executable to block further transmission of the CM signal or prevent the CM signal from reaching the terminating fax machine. The memory 310 may include logic that is executable to, in response to receiving the CM signal, generate a modified Joint Menu (JM) signal 320 wherein the modified JM signal indicates that V.34 half-duplex is not an transmission option. Additional logic may be included to disable one or more G3 modulation modes to further reduce the data rate. The logic 320 may be executable to set the V.34 half-duplex modulation bit of the modified JM signal to zero. The modified JM signal forces the originating fax machine to fall back to G3 speed and communicate using a G3 protocol. The memory 310 may include logic that is executable to transmit the modified JM signal to the originating fax machine 322. The logic 322 may be executable to transmit the modified JM signal to the originating fax machine via a public switched telephone network and transmit a fax via a packet network.

The network interface 330 may be an interface for receiving or transmitting communication, such as signals, messages, or other data. For example, the network interface 320 may include a first network interface that is coupled with a PSTN, such as a TDM interface, and a second network interface coupled with the packet network 30, such as an IP/TCP interface, of FIG. 1.

Figure 4:
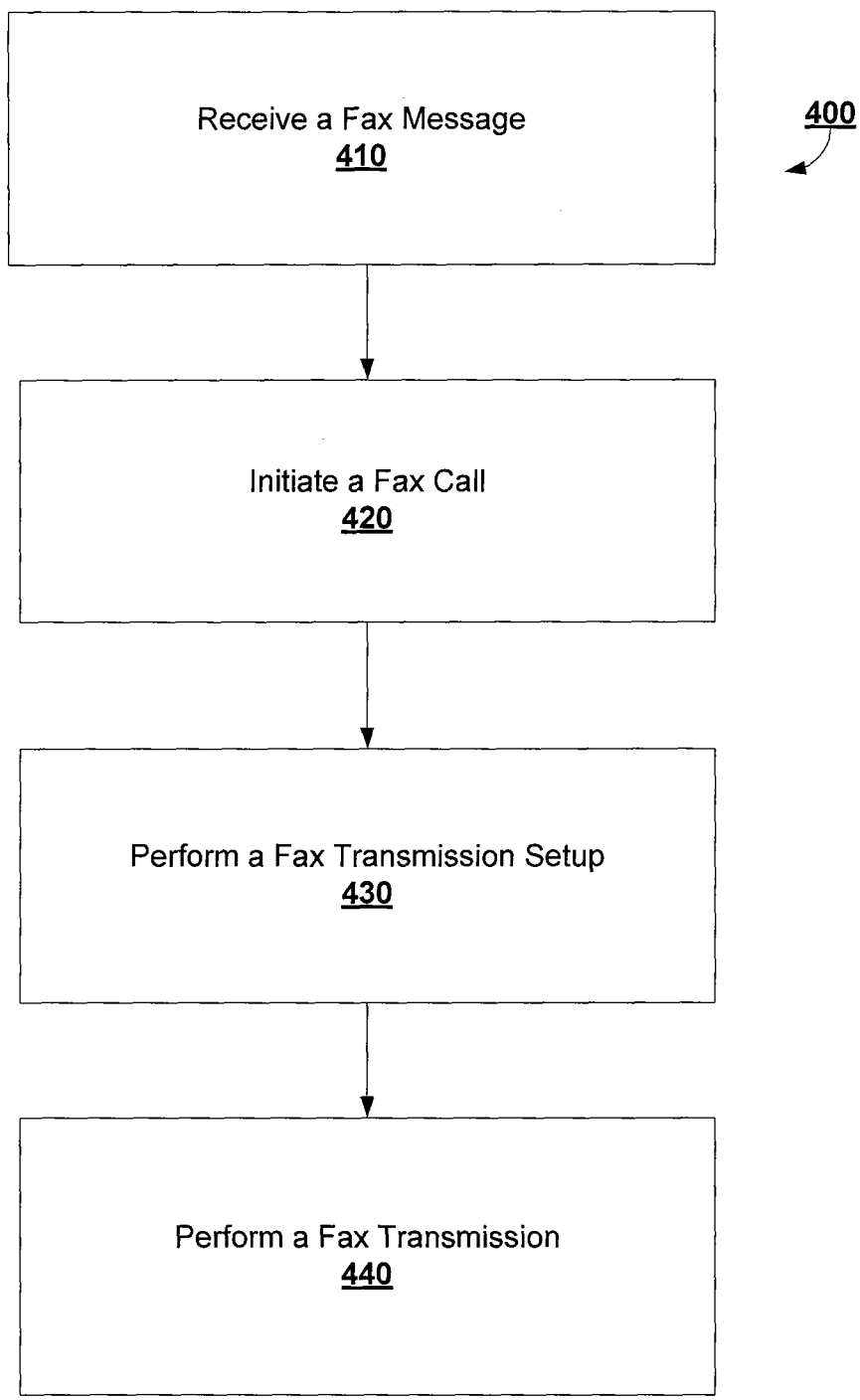
FIG. 4 illustrates one embodiment of a method for transmitting a fax.

FIG. 4 illustrates one embodiment of a method 400 for transmitting a fax. The acts shown in FIG. 4 may be performed in the order shown or a different order. For example, act 410 may be performed after act 420. The method 400 may be performed by one or more of the components shown in FIG. 1. In act 410, an originating fax machine may receive a fax message. Receiving the fax message may include scanning, copying, retrieving, requesting, or otherwise obtaining a copy of a fax message. The fax message may include fax data to be transferred to the terminating fax machine. In act 420, the originating fax machine may initiate a fax call to the terminating fax machine. In act 430, fax transmission setup may be performed.

Figure 5:
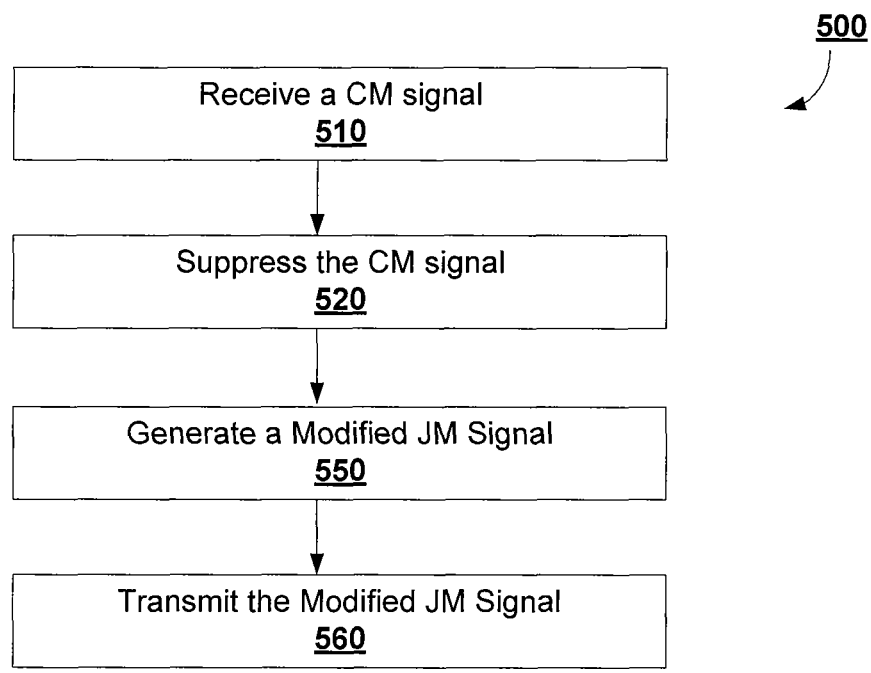
FIG. 5 illustrates one embodiment of a method for fax transmission setup.

FIG. 5 illustrates one embodiment of a method 500 for fax transmission setup. The fax transmission setup may be a handshake process or a setup process for agreeing upon fax transmission parameters. In act 510, a gateway may receive a Call Menu (CM) signal from an originating fax machine. The first CM signal may be generated, for example, by the originating fax machine, in response to an ANSam signal. In act 520, the gateway may suppress the CM signal. The gateway may detect the CM signal by monitoring a sequence of bits Suppressing the CM tone or signal may include blocking the CM signal from reaching a terminating fax machine. In response to receiving the CM signal, the gateway may generate a modified Joint Menu (JM) signal, as shown in act 550. Generating the modified JM signal includes setting the V.34 half-duplex modulation bit to zero. The modified JM signal may indicate that V.34 half-duplex is not an option during fax transmission. The modified JM signal may force the originating fax machine to fall back to G3 speed and communicating using the G3 protocol. As shown in act 560, the gateway may transmit the modified JM signal to the originating fax machine. Transmitting the modified JM signal may include transmitting the modified JM signal to the originating fax machine via a public switched telephone network.

Referring back to FIG. 4, once fax transmission setup is complete or falls back to G3 operation, the originating fax machine and terminating fax machine may continue to fax transmission or complete fax transmission setup using G3 operation. For example, in one embodiment, when the modified JM signal forces G3 operation, the originating fax machine and terminating fax machine may complete fax transmission setup by communicating transmission speed and/or transmission protocol to each other.

Once fax transmission setup is complete, the originating fax machine and terminating fax machine may perform fax transmission at the agreed upon or forced fax transmission speed, for example, G3 speed, and using the agreed upon or forced fax transmission protocol, for example, G3 protocol.

In act 440, fax transmission is performed. Fax transmission may include transmission of the fax data using the agreed upon or forced fax transmission speed, for example, G3 speed, and using the agreed upon or forced fax transmission protocol, for example, G3 protocol.

Various embodiments described herein can be used alone or in combination with one another. The foregoing detailed description has described only a few of the many possible implementations of the present invention. For this reason, this detailed description is intended by way of illustration, and not by way of limitation.

The invention claimed is:

1. A method comprising:
   receiving a Call Menu (CM) signal from an originating fax machine at a gateway, wherein the CM signal is intended for a terminating fax machine;
   suppressing the CM signal, at the gateway, after a preamble of the CM signal;
   generating a modified Joint Menu (JM) signal, at the gateway, in response to receiving the CM signal, wherein the modified JM signal indicates that V.34 half-duplex modulation is not an option;
   squelching a signal from the terminating fax machine, at the gateway, and replacing it with the modified JM signal; and
   transmitting the modified JM signal to the originating fax machine.

2. The method as claimed in claim 1, wherein suppressing the CM signal includes blocking the CM signal so that the terminating fax machine does not receive the CM signal.

3. The method as claimed in claim 1, wherein the modified JM signal forces the originating fax machine to fall back to G3 speed and communicate using the G3 protocol and further disables at least one G3 modulation modes.

4. The method as claimed in claim 1, further comprising:
   receiving an ANSam signal from the terminating fax machine via a packet-based network, wherein the CM signal was generated by the originating fax machine in response to the ANSam signal.

5. The method as claimed in claim 4, wherein transmitting the modified JM signal includes transmitting the modified JM signal to the originating fax machine via a public switched telephone network.

6. The method as claimed in claim 1, further comprising detecting the CM signal by monitoring a sequence of bits in the CM signal.

7. The method as claimed in claim 1, wherein generating the modified JM signal includes setting the V.34 half-duplex modulation bit to zero.

8. The method as claimed in claim 1, wherein suppressing the CM signal occurs after the preamble of the CM signal and before two CM sequences.

9. Logic encoded in one or more non-transitory tangible computer-readable storage media for execution and when executed by a processor, operable to:
   receive a first Call Menu (CM) signal from an originating fax machine at a gateway, the CM signal intended for an answering fax machine;
   suppress the CM signal at the gateway after a preamble of the CM signal;
   generate, at the gateway, a modified Joint Menu (JM) signal in response to receiving the CM signal, wherein the modified JM signal indicates unavailability of V.34 half-duplex;
   squelch a first digital identification signal from the answering fax machine at the gateway by replacing the first digital identification signal with the modified JM; and transmit the modified JM signal to the originating fax machine.

10. The one or more non-transitory tangible computer-readable storage media of claim 9, wherein CM signal is blocked so that the CM signal does not reach a the answering fax machine.

11. The one or more non-transitory tangible computer-readable storage media of claim 9, wherein the modified JM signal forces the originating fax machine to fall back to G3 speed and communicating using a G3 protocol.

12. The one or more non-transitory tangible computer-readable storage media of claim 9, wherein the CM signal is generated in response to an ANSam signal received from the answering fax machine via a packet-based network or a public switched telephone network.

13. The one or more non-transitory tangible computer-readable storage media of claim 9, wherein the logic is operable to detect the CM signal by monitoring a sequence of bits in the first CM signal.

14. The one or more non-transitory tangible computer-readable storage media of claim 9, wherein the modified JM signal limits the G3modulation to only use lower speed options and indicates that V.34 half-duplex is not an option by setting the V.34 half-duplex modulation bit to zero.

15. A device comprising:
a time division multiplexing (TDM) interface; and
a detector in a packet-based channel at the TDM interface, wherein the detector monitors for V.8 Call Menu (CM) sequences that indicate a fax operation is requested and monitors for a V.21 flags detected peer-to-peer message from a remote gateway that transmits signals to the device from an answering fax machine,
wherein the detector, in response to detecting a V.8 CM sequence, generates a V.8 Joint Menu (JM) signal, the V.8 JM signal excluding an indication of SG3 fax modulation capabilities and the detector further transmits the V.8 JM signal to an originating fax machine via the TDM interface as a replacement for a digital identification signal received from the answering fax machine.

16. The device of claim 15, wherein the detector receives the V.8 CM sequences from the originating fax machine via the TDM interface.

17. The device of claim 15, wherein the V.8 JM signal forces fallback to G3 operation and further disables at least one G3 operation modes.

18. The device of claim 17, wherein fallback includes forcing communication at G3 speed and using a G3 protocol.

19. The device of claim 15, wherein excluding the indication of SG3 fax modulation capabilities includes setting the V.34 half-duplex modulation bit to zero.

20. The device of claim 15, wherein the detector waits a nominal time interval for the CM sequences to cease when a V.21 flag is received.

* * * * *